No. 856,599. PATENTED JUNE 11, 1907.
W. NICE, Jr.
BALL BEARING.
APPLICATION FILED JUNE 15, 1906.
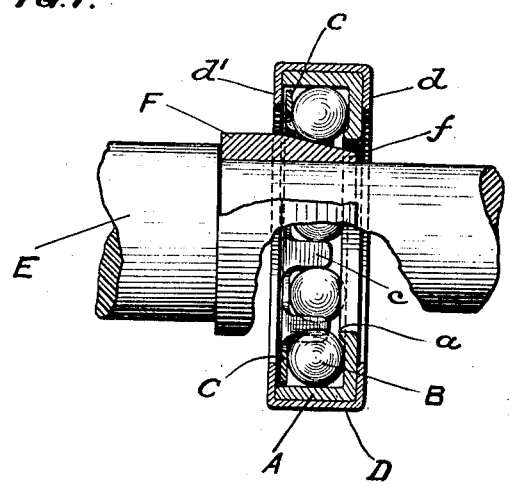
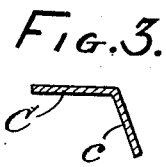
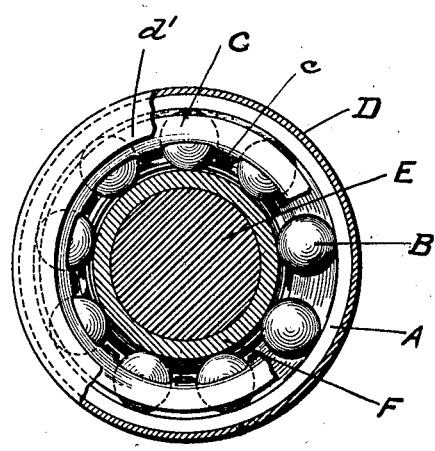
WITNESSES:—
INVENTOR:—
BY
ATTORNEY.

UNITED STATES PATENT OFFICE.

WILLIAM NICE, JR., OF OGONTZ, PENNSYLVANIA.

BALL-BEARING.

No. 856,599.     Specification of Letters Patent.     Patented June 11, 1907.

Application filed June 15, 1906. Serial No. 321,850.

*To all whom it may concern:*

Be it known that I, WILLIAM NICE, Jr., a citizen of the United States, and a resident of Ogontz, in the county of Montgomery and State of Pennsylvania, have invented certain Improvements in Ball-Bearings, of which the following is a specification.

This invention is more particularly a ball bearing having an improved separator for holding the balls apart while sustaining them in their race, and for permitting them to be separately inserted and withdrawn, in combination with a jacket for holding the separator and race in their proper relation.

In the accompanying drawings, Figure 1 is a transverse sectional view representing the invention, parts being broken away for the purpose of illustration, Fig. 2 is a plan view of the same with parts broken away and Fig. 3 represents a transverse sectional view through the separator and a finger thereon.

The bearing comprises a race A, of substantially L-shaped cross section, having a flange $a$ for retaining the balls B, and a sheet metal separator C, having fingers $c$ cut out and bent at an obtuse angle to the body to hold the balls in the race and separate them so that they do not make contact, in combination with a soft metal jacket D having a flange $d$ turned over the angle of the race and the parallel flange $d'$ turned over the top of the race and the body of the separator, the latter lying within the adjacent member of the race. Through the opening in the bearing ring thus formed is inserted the shaft E on which may be fitted a sleeve F having a conical bearing surface $f$ for engaging the balls which carry the thrust or weight upon the shaft.

As it is sometimes necessary to remove and replace balls, on account of their breaking or for other reasons, fingers $c$ of flexible character permit this to be done without dissociating the parts since such fingers can be bent up, turned down, or adjusted to any position desired.

Having described my invention I claim:—

1. A ball bearing comprising a race, balls carried thereby, a floating device resting upon said balls and having fingers separating them, and means for securing said floating device in operative relation to said race and balls said fingers being flexible and said parts disposed to permit the removal and insertion of said balls in the assembled relation of said parts.

2. A ball bearing comprising a circular race of substantially L-shaped cross section, balls supported by said race, a separator pressed to shape from sheet metal and having fingers disposed between said balls, and a jacket having flanges which hold said race and separator together.

3. A ball bearing comprising a race, in combination with balls, a separator having a body resting upon said balls and fingers bent at an obtuse angle thereto for retaining and separating said balls, and a jacket having parallel flanges for holding said race and separator together.

4. A ball bearing comprising a race, balls bearing upon said race, a pressed sheet metal separator having a body resting upon said balls and fingers disposed at an obtuse angle to said body for retaining and separating said balls, and a soft metal jacket having parallel flanges thereon which hold said separator and race together.

In testimony whereof I have hereunto set my name this 12th day of June, 1906, in the presence of the subscribing witnesses.

WM. NICE, JR.

Witnesses:
 Jos. G. DENNY, Jr.,
 ROBERT JAMES EARLEY.